United States Patent
Bense Candela et al.

(10) Patent No.: US 12,252,403 B2
(45) Date of Patent: Mar. 18, 2025

(54) FILTERING MATERIAL AND FILTER FOR RETAINING POLYAROMATIC HYDROCARBONS, CARBONYLS AND OTHER COMPOUNDS FROM SMOKE FROM TOBACCO PRODUCTS

(71) Applicants: COMPAÑIA INDUSTRIAL DE TABACOS MONTE PAZ S.A., Montevideo (UY); UNIVERSIDAD DE LA REPÚBLICA, Montevideo (UY)

(72) Inventors: Tomás Bense Candela, Montevideo (UY); Magela María Banchero Isasmendi, Montevideo (UY); Eleuterio Francisco Umpiérrez Vázquez, Montevideo (UY); Cristina Rufener, Montevideo (UY); Juan Pablo Villanueva, Montevideo (UY); Helena Pardo, Montevideo (UY); Ricardo Faccio, Montevideo (UY); Alvaro Mombrú, Montevideo (UY)

(73) Assignees: COMPANIA INDUSTRIAL DE TABACOS MONTE PAZ S.A., Montevideo (UY); UNIVERSIDAD DE LA REPUBLICA, Montevideo (UY)

( * ) Notice: Subject to any disclaimer, the term of this patent is extended or adjusted under 35 U.S.C. 154(b) by 549 days.

(21) Appl. No.: 17/621,149

(22) PCT Filed: Mar. 3, 2020

(86) PCT No.: PCT/IB2020/051801
§ 371 (c)(1),
(2) Date: Dec. 20, 2021

(87) PCT Pub. No.: WO2021/048637
PCT Pub. Date: Mar. 18, 2021

(65) Prior Publication Data
US 2022/0348469 A1    Nov. 3, 2022

(30) Foreign Application Priority Data
Sep. 10, 2019   (UY) .......................... 38364

(51) Int. Cl.
*B01J 20/20* (2006.01)
*A24D 3/16* (2006.01)
*B01J 20/00* (2006.01)
*C01B 32/198* (2017.01)
*B82Y 40/00* (2011.01)

(52) U.S. Cl.
CPC ............. *C01B 32/198* (2017.08); *A24D 3/16* (2013.01); *B01J 20/00* (2013.01); *B01J 20/20* (2013.01); *B82Y 40/00* (2013.01)

(58) Field of Classification Search
CPC ........................................................ B01J 20/20
See application file for complete search history.

(56) References Cited

U.S. PATENT DOCUMENTS

| 2003/0170165 A1* | 9/2003 | Kojima | B01J 20/2803 |
| | | | 423/445 R |
| 2015/0129502 A1* | 5/2015 | Meng | B01J 20/3234 |
| | | | 210/660 |
| 2020/0048095 A1* | 2/2020 | Xie | C01B 32/318 |

FOREIGN PATENT DOCUMENTS

| CN | 105054294 A | 11/2015 |
| CN | 105504341 A | 4/2016 |
| CN | 105919160 A | 9/2016 |
| WO | WO-2012/054111 A1 | 4/2012 |
| WO | WO-2014/059101 A1 | 4/2014 |

OTHER PUBLICATIONS

Guo et al., "Electrospun graphene oxide / carbon composite nanofibers with welldeveloped mesoporous structure and their adsorption performance for benzene and butanone," Chemical Engineering Journal, 2016, vol. 306, pp. 99-106.

Yu et al., "Lyophilized carbon nanotubes/graphene oxide modified cigarette filter for the effective removal of cadmium and chromium from mainstream smoke," Chemical Engineering Journal, 2015, vol. 280, pp. 58 to 65.

Palmer et al., "Atomistic models for disordered nanoporous carbons using reactive force fields," Microporous and Mesoporous Materials, vol. 514, 2012, pp. 24-37.

Martinez et al., "Rethinking the term "pi-stacking"," Chemical Science, 2012, vol. 3, pp. 2191 to 2201.

Hunter et al., "The Nature of π-π Interactions," Journal American Chemical Society, vol. 112, 1990, pp. 5525-5534.

Kim et al., "Toluene and acetaldehyde removal from air on to graphene-based absorbents with microsized pores," Journal of Hazardous Materials, 2018, vol. 344, pp. 458 to 465.

* cited by examiner

*Primary Examiner* — Stuart L Hendrickson
(74) *Attorney, Agent, or Firm* — MUNCY, GEISSLER, OLDS & LOWE, P.C.

(57) ABSTRACT

A hybrid graphene material and a filter capable of retaining, in whole or in part, polyaromatic hydrocarbons, carbonyl and other smoke compounds from tobacco products or industrial processes, having as adsorbent substances activated carbon and graphene materials, both supported by the same matrix and in the same filter compartment, which may or may not be attached to another conventional filter compartment of cellulose acetate fibers or similar polymer, and a method for manufacturing such material.

2 Claims, 4 Drawing Sheets

FILTERING MATERIAL AND FILTER FOR RETAINING POLYAROMATIC HYDROCARBONS, CARBONYLS AND OTHER COMPOUNDS FROM SMOKE FROM TOBACCO PRODUCTS

FIELD OF THE INVENTION

This invention belongs to the field of filtration systems and materials, more specifically, of hybrid filter preparation processes based mainly on micro and nanocarbon materials supported in porous polymeric structures.

In particular, but not exclusively, of gas filters that exhibit, simultaneously, special selectivity for polyaromatic hydrocarbons, such as those present in the main smoke stream of tobacco products and high selectivity for carbonyl and other smoke compounds.

PRIOR ART

Cigarette smoke is divided into a main stream entering the smoker's body, a side stream or "second hand" which is a mixture of smoke exhaled by the smoker and smoke from the side stream of the cigarette, and "third hand," i.e. the environmental pollution that persists after the tobacco product is turned off. The particle and vapor fractions in cigarette smoke include thousands of chemicals, distributed according to the diagram illustrated in FIG. 1. Among these, there are groups or families of chemicals especially undesirable because of their toxic properties. Undesirable health compounds or families are often referred to as Hoffman compounds or families and they are grouped by their chemical structures and functionalities.

Indiscriminate filtration to eliminate or reduce the level of these substances would also eliminate substances that are not toxic, but which contribute to the taste and aroma of cigarettes, thus affecting its organoleptic properties, and therefore its commercial value.

For this reason, in order to reconcile the commercial and health requirements of tobacco products, technologies that allow the selective extraction to reduce or eliminate undesirable products from smoke have become particularly important, improving its health profile, but respecting sensory properties.

The interest in selective filters and their existence on the market is not new, the typical example being activated carbon particles on cellulose acetate fibers being the "Dalmatian" filters known for decades.

It has been long demonstrated that coal shows selectivity toward carbonyl and that to withstand coal on highly porous polymeric supports, it allows for obtaining filters with a high concentration of carbon material and, therefore, achieve better results.

In recent years, there has been a growing interest in the development and study of graphene-based porous nanomaterials, as they combine the properties of graphene materials with a pore structure providing these materials a greater specific surface area. This makes them excellent candidates for the manufacture of different types of filtration systems due to potential commercial applications and the interesting physical-chemical properties related to the retention capacity of various types of molecules, especially organic. Therefore, this capability opens up a large number of potential applications in the development of highly efficient filtration systems.

The activated carbon/binder polymer system (very high molecular weight polyethylene) has already been developed by Celanese Acetate (CelFx Technology), the novelty of which results from a high concentration of activated carbon enclosed in a highly porous support mass. Following a trade agreement with Celanese, the co-owner has exploited this development in the Floyd cigarette brand in its various versions. Document WO 2012/054111 suggests the possibility of investigating the applications of this porous mass as a support for countless possible materials and chemicals, including new forms of carbon such as graphene, nanotubes, fullerenes, etc., although in practice this has not been applied so far in any market product. This document describes a porous mass filter with active particle and plasticizer of high molecular weight, with porous mass wrapped around the longitudinal axis, with activated carbon and graphene as options, in separate compartments of the same filter. Therefore, the filter described in this document does not respond to the filter subject to this invention.

Document US 2019/0000136 A1, which has as its priority document the Chinese patent CN 2017/071331, describes a graphene-based filter, which differs from that of the present invention, in two main aspects. The material described is not a hybrid material, and the graphene they reference, graphene aerogel, is pure graphene. This aspect makes this invention very difficult to implement because of its cost for conventional cigarettes. The other difference is that the type of filter described in this document is segmented, while that of the present invention is a unique cavity filter.

Document CN 105054291 (A) refers to a material with filter capacity, where graphene adsorbs on cellulose fibers. This material differs from that of the present invention in that the graphene present in the hybrid material claimed therein is adsorbed on microparticles of activated carbon and these particles are incorporated into a highly porous polymer matrix. This makes the process of obtaining hybrid material more scalable and economically feasible.

Other Chinese patent documents, CN 204444223, CN 204444224, CN 108378416A, and CN 107373750, refer to filters of various cavities or sections, where one of them is made of graphene or graphene oxide, alone or supported on cellulose acetate. However, none of them describes the use of hybrid graphene materials, the process of obtaining graphene, or using exfoliated graphene in surfactant-assisted aqueous media, as described in this invention.

Document WO 2017/187453 describes a method of synthesis of graphene, as well as a reusable filter based thereon, which may be an independent item or may be bonded to the cigarette. The object of invention WO 2017/187453 is totally different from the one claimed in the present invention, as the former does not use hybrid graphene materials, the method of synthesis differs from that used in this invention, and the type of filter it proposes is different from that of this invention.

Document WO 2010/126686 refers to the use of carbon nanotubes scattered over a substrate in filters to reduce and/or eliminate the number of constituents in a fluid, which may be water or air.

In the documents described above, the use of multicomponent composite materials based on activated carbon and graphene materials supported on polymeric matrices in the same compartment is not considered, nor has a matrix been implemented that supports graphene and allows it to manufacture a viable filter, as it is in this invention.

In summary, the documents disclosed herein do not reveal the technological solution of how to incorporate carbon nanomaterials into highly porous polymer matrices that allow the manufacture of filters with an adequate pressure drop according to the intended application, for example, for the manufacture of filters for tobacco smoke.

It is also of particular relevance that in no case is the use of graphene or graphene materials and activated carbon in the same compartment even considered, as stated in the present invention, which is a major technological advantage from the point of view of filter manufacturing and cost-effectiveness.

BRIEF DESCRIPTION OF THE INVENTION

Broadly, the present invention deals with the development of hybrid materials (composites) composed of inactivated and/or activated micro and nanocarbon materials, such as graphene, graphene oxide, few-layer graphene sheets, carbon nanotubes, nanoparticles of graphite and carbon obtained from pure graphite supported on activated carbon and included on a porous polymer matrix, which are particularly suitable for use in the manufacture of filters, in particular, but not exclusively, of gases.

The invention also includes the development of a method to prepare hybrid materials such as: micronized graphite/activated carbon/nanocarbon materials-activated or inactivated-/highly porous polymer, especially suitable for use in the manufacture of filtration systems.

Furthermore, the invention deals with the design and development of a filter of high selectivity and efficiency for volatile compounds in general, and, in particular, carbonyls and aromatic and polyaromatic hydrocarbons, manufactured from the hybrid material subject to this invention, especially suitable, but not exclusively, for the manufacture of smoke filters of tobacco products. However, the material may be used in water and gas filters produced by other industry than tobacco.

DETAILED DESCRIPTION OF THE INVENTION

The present invention consists of the development of a hybrid (composite) material based on graphene oxide and/or graphene and/or few-layer graphene sheets and/or carbon nanotubes-fully or partially activated-supported on microparticles of activated carbon and/or micronized graphite, thus acting as microstructural supports of nanocarbon materials. These hybrid microparticles are homogeneously incorporated into highly porous polymer supports in order to obtain a macroscopic hybrid system that exhibits a highly porous micro and nanoscopic architecture and a very high specific surface, greater than 900 $m^2/g$.

In turn, the invention discloses the process of obtaining this hybrid material, and the design and development of a filter of high selectivity and efficiency for volatile compounds in general, but not exclusively, for the filtering of tobacco smoke in cigarettes.

Material Object of this Invention:

The so-called hybrid or composite materials consist of two or more materials of different physic-chemical properties which, when combined, result in another material with properties other than that of the individual components.

Nanocarbon materials are carbon-based nanomaterials, such as fullerenes, nanotubes, nanofibers, graphene, graphene oxide, few-layer graphene sheets, exfoliated graphite, etc., which, because of their unusual physical, chemical and mechanical properties, have become one of the most important material families of the last decade.

Among the nanocarbon materials used in this invention are carbon nanotubes. Carbon nanotubes are windings of graphene planes forming a tube, with an open or closed end. There are two types of nanotubes: multiple wall nanotubes (MWNT), the easiest to obtain, and single wall nanotubes (SWNT). MWNT are basically built by SWNT of multiple radius located concentric to each other. In terms of their mechanical properties, all evidence indicates that nanotubes are very flexible, resistant to fracture, extension and compression. They have relatively large thermal stability (they begin to deteriorate into air at 750° C. and into vacuum at approximately 2800° C.) and are estimated to have a thermal conductivity twice that of diamonds. They have a relatively low density ranging between 1.33 and 1.44 $g/cm^3$ and, which is key for this invention, they have large surface areas—approximately 1000 $m^2/g$ for single-wall nanotubes—due to their structure and physical form.

Graphene oxide may be incorporated into the claimed material. Graphene oxide is a graphene material of interest for itself and is also one of the main precursors of graphene. Its atomic structure consists of a single layer of carbon atoms consisting of carbon hexagons with hybridization $sp^2$, but unlike graphene, a certain proportion of these are randomly bound to oxygen atoms, presenting hybridization $sp^3$. Therefore, the surface of graphene oxide is functionalized on both sides with hydroxyl, epoxide and carbonyl groups, and the edges with carboxyl groups. Different types of molecules may bind to graphene oxide by both covalent and non-covalent bonds.

Another of the nanomaterials incorporated into the hybrid material is graphene. The crystalline structure of graphene consists of a two-dimensional array of honeybee type carbon atoms covalently bound together by $sp^2$ bonds, making it the first example of actual existence of two-dimensional crystal. The thickness of a single layer of graphene ranges between 0.34 and 1.6 nm. In the case of graphene, its reactivity is mainly due to non-covalent interactions since, ideally, it should not present oxygenated functions in its structure. In spite of the above, in practice, the process results in a certain proportion of residual oxo groups, so that they may also be established, although in small extension, from them covalent bonds with organic molecules.

During the process of obtaining the hybrid material disclosed herein, a mixture of graphene and few-layer graphene sheets is obtained. The few-layer graphene sheets (few-layer graphene) is obtained by stacking between 3 and 10 graphene sheets.

In particular, the huge system of π de-localized electrons that characterizes graphene systems provides a sheet structure rich in electrons on both sides, which results in a strong affinity for aromatic compounds, thus making them excellent adsorbents thereof.

The material revealed in this invention is defined as a hybrid graphene material with characteristics that have not been reported to date. Also, this material, when used in the manufacture of cigarette filters, has demonstrated excellent performance.

Hybrid Material Collection Process:

The hybrid material process described above (FIG. 2) consists basically of a first stage of micronization of the graphite or carbon material by applying ultrasound to an aqueous dispersion of said material. The use of commercially available graphite is useful for this process. In this process, surfactants or stabilizers, such as polysorbates, polyvinylpyrrolidone, N-methyl pyrrolidone, sodium dodecyl sulphate, etc., may or may not be incorporated into the aqueous solution in an appropriate concentration.

Two embodiments may be used to manufacture of nanocarbon materials or to obtain graphene oxide by one of the usual methods, such as the modified Hummer method, or the liquid phase exfoliation assisted by the presence of surfactants and/or stabilizers, such as those mentioned above, in the medium, using a high performance rotor-stator type equipment.

In a typical synthesis of graphene oxide, 2 g of graphite are weighed, to which 100 ml of concentrated $H_2SO_4$ is added by agitation in a shaker plate at room temperature. The mixture is placed in an ice bath until the ice bath temperature drops to approximately 5° C., and approximately 8 g of $KMnO_4$ is added to the mix by magnetic agitation and ice bath. 100 ml of cold distilled water is added very slowly. It is left agitating for 1.5 hours. $H_2O_2$ is added drop by drop until the mixture stops bubbling. The mixture is left to rest all night. The supernatant is discarded. Washing is done by centrifugation or by decanting the solution. The pellet is washed with 5% HCl in successive steps until the pH reaches a value close to 3 or higher. To obtain exfoliated graphene oxide, it is sonicated with pointer sonicator.

The graphene oxide thus obtained may be used as such and/or as reduced graphene oxide. Various methods, such as chemical, thermal or hydrothermal reduction, may be used to achieve this reduction. A hydrothermal reactor was used to obtain graphene oxide. The exfoliated graphene oxide suspension is placed until it reaches a filling ranging between 70 and 80% of the total autoclave volume, it is heated to a temperature ranging between 10° and 130° C. for 4 to 12 hours.

The synthesis of few-layer graphene is performed in liquid phase assisted by surfactants using a high-energy pointer sonicator or by high-performance stator-rotor type equipment.

A typical synthesis involves the treatment of 10 g of graphite, suspended in a volume ranging between 200 and 1000 ml. The surfactant to be used is dissolved in this solution in a ratio ranging between 1 and 20%. Micronization of the graphite to be used as a precursor of the above synthesis may also be achieved by aqueous phase sonication.

The forms described above provide the nanocarbon materials to be used later for the manufacture of the hybrid material: graphene oxide, graphene, few-layer graphene sheets, exfoliated graphene, carbon nanoparticles or carbon nanotubes.

The activation process is the process of creating pores in carbon materials. This activation process may determine the micro and nanostructure (defects, pores, edges, layer size) of the resulting material and, therefore, have a dramatic impact on its performance as a molecular filter.

Different methods may be used for the activation of carbon materials, such as oxidative treatments in the presence of strong acids, such as sulfuric acid and nitric acid, solid state treatments of carbon precursors with sodium hydroxide or potassium at high temperatures, or preferably, treatments with gases or mixtures thereof, such as nitrogen or carbon dioxide, at high temperatures.

The activation of the obtained graphene materials is carried out, preferably, in the gaseous phase, for which these dry materials are subjected in a closed oven to a flow, for example, of hot $CO_2$, within a temperature range of 500 to 1100° C. for time periods of 1 to 10 hours.

The graphene materials thus obtained are mixed with activated carbon of granulometry between, for example 35 and 70 mesh, with agitation and at a temperature, for example, ranging between 5° and 90° C. for a period long enough to keep the suspension temporarily stabilized. After this period, the system is subjected to vacuum evaporation at a temperature, for example, ranging between 5° and 70° C., obtaining the dry carbon material which will then be combined with high molecular weight polyethylene.

The invention also includes the development of composite materials made from the abovementioned hybrid material, on which they incorporated metallic salts, in particular, copper, zinc and iron, supported on highly porous polymeric supports.

The invention also includes the development of composite materials made from the abovementioned hybrid material and metal nanoparticles, such as copper, zinc and iron, supported on highly porous polymeric supports.

The invention also includes the development of composite materials made from the abovementioned hybrid material and microparticulate zeolites substituted with metals, such as copper, iron or zinc, supported on highly porous polymeric supports.

Filter Design and Development

With regard to the filtering system subject to this invention, a filter material was developed that includes simultaneously graphene and activated carbon fixed on porous masses consisting of polyethylene of very high molecular weight that have the advantage of forming compound structures binding adsorbent particles and offering very little resistance to smoke passage, allowing very low pressure drop filters to be obtained.

In a system of the complexity that we are considering, there certainly are different types of molecular interactions mainly of the non-polar type and mostly conditioned by the $sp^2$ hybridizations of carbon atoms. In general, such interactions are usually covered by the concept of dispersal forces (Van der Waals, London, Debye, Keeson, etc.).

In our case, considering activated carbon as a disorganized form of graphite with a random or amorphous structure but where, at atomic scale, localized structures of aromatic rings exist under forms of random-oriented graphene nanocrystals[1], the interactions of the σ-π orbital set (Hunter and Sanders[2,3]) between the aromatic rings of graphene and graphene nanocrystals of activated carbon are specially relevant. These interactions are outlined in FIG. 3 and will manifest with different intensities depending on the mutual orientation of the interacting systems. π-π repulsion is overcome given the greatest stabilizing force of the σ-π bonds.

In the filtration system subject to this patent, these nanocarbon combinations are mixed with high molecular weight polyethylene and subjected to a temperature of 200° C. for 20 minutes, resulting in a highly porous mass that supports adsorbent particles. This is a typical sintering process, in which the thermoplastic material is heated to a high temperature but lower than the melting temperature, creating strong bonds between its particles through atomic diffusion at the points of contact between these particles.

This sintering process may be performed on a metal mold that, in the case of a cigarette filter, may be a cylinder of suitable diameter for the design of the cigarette to which it is intended to be attached. This operation could also be performed continuously on a device specially designed for such purposes.

In FIG. 4 a SEM (Scanning Electron Micrography) image of a very high molecular weight polyethylene sintered porous mass can be observed. In FIG. 5 a SEM image of the filter object of this invention is presented, where the sintered particles (clear tones) that create a supporting structure between the carbonous particles are observed.

The invention involved the study of the balance between the granulometries (nanometric and metric) of the components and the investigation of the most appropriate mixing procedure to avoid mutually damaging interactions between the adsorption capacities of the adsorbents involved.

This study has shown that such negative interactions are not present, and the filter operates efficiently for the retention of polyaromatic hydrocarbons, carbonyls and volatile compounds. The proportions of the filter components were also regulated to generate porous masses of optimal physical properties, particularly in terms of firmness, porosity and filter capacity.

The filter of this invention also has the advantage of achieving successful filtration of two large groups of undesirable cigarette smoke components in a single filter sector and may be applied to different tobacco products such as cigarettes, pipes, water pipes (hookah), electronic cigarettes, products heating and do not burning tobacco (HNB, "heat not burn"), and any other smoke or vapor emission device. In the particular case of its commercial application to the design of a cigarette, another sector consisting of cellulose acetate fibers according to the traditional structure of conventional filter cigarettes is attached to said sector. While this second sector provides some non-selective filtering effect, its main purposes in our case are: to incorporate a neat termination at the mouth end of the cigarette and, eventually, in the designer's opinion, to include a ventilation system by micro laser perforations in the cigarette nozzle, introduce aroma-releasing capsules by manual compression and even intervene in the regulation of the residence times of smoke in contact with filter materials.

FIG. 5 illustrates a SEM image of the filter of the present invention, where the synthesized particles and clear tones are observed, which create a supporting structure between the carbon particles.

EXAMPLES OF THE EFFICIENCY OF THE FILTER DISCLOSED BY THIS PATENT

Case 1.

Cigarettes, A and B, were analyzed.
The composition of the porous masses of these cigarettes is as follows:
   Cigarette A: Activated carbon 70%+graphene 6%+GUR 24%
   Cigarette B: Activated carbon 70%+GUR 30% (REFERENCE)

The main difference between the two cigarettes is the presence of graphene in the porous mass of A. The other physical and chemical properties are very similar in both products, with ventilation in the nozzles being 60% in both cases. Pressure drops were maintained in the range of 120 to 140 mmH$_2$0. Tobacco in both tobacco columns is the same.

The two groups of cigarettes were simultaneously smoked in a Cerulean SM450 smoking machine under the Health Canada Intensive regimen (six replicates of each cigarette) and the extracts were analyzed according to the internal method where 13 polyaromatic hydrocarbons were quantified. The results of the analysis are summarized in Table I, which shows the significant reduction of several polyaromatic hydrocarbons in the smoke of the main cigarette current regarding cigarette B (reference).

TABLE I

% reduction of polyaromatic hydrocarbons in cigarette A taking as reference cigarette B

| | Naph-talene | Acenaph-thylene | Acenaph-thene | Fluo-rene | Anthra-cene | Phenan-trene | Fluoran-thene | Py-rene | Chry-sene | Benzo[a]anthra-cene | Benzo[k]fluoran-thene | Benzo[b]fluoran-thene | Benzo[a]pyrene |
|---|---|---|---|---|---|---|---|---|---|---|---|---|---|
| Average cig. A (μg/cig) | 85 | 64 | 59 | 171 | 108 | 120 | 40 | 32 | 3.9 | 4.9 | 11 | | 7 |
| Std. dev. cig. A (μg/cig) | 15 | 10 | 8 | 17 | 12 | 14 | 6 | 12 | 0.4 | 0.4 | 1.7 | | 1 |
| Average cig. B (μg/cig) | 240 | 112 | 106 | 307 | 200 | 186 | 65 | 50 | 5.8 | 8 | 20 | | 12 |
| Std. dev. cig. B (μg/cig) | 18 | 20 | 11 | 31 | 13 | 15 | 10 | 6 | 0.2 | 1 | 2 | | 2 |
| % Reduction | 64 | 43 | 45 | 44 | 46 | 36 | 39 | 36 | 33 | 37 | 45 | | 42 |

REFERENCES (1) Jeremy C. Palmer, Keith E. Gubbins, Microporous and Mesoporous Materials 154 (2012) 24-27
(2) C. A. Hunter, J. K. M. Sanders, J. Am. Chem. Soc. 1980, 112, 5525-3534
(3) Ch. R. Martinez, B. L. Iverson, Chem. Sci. 2012, 3, 2191

Figure 1:
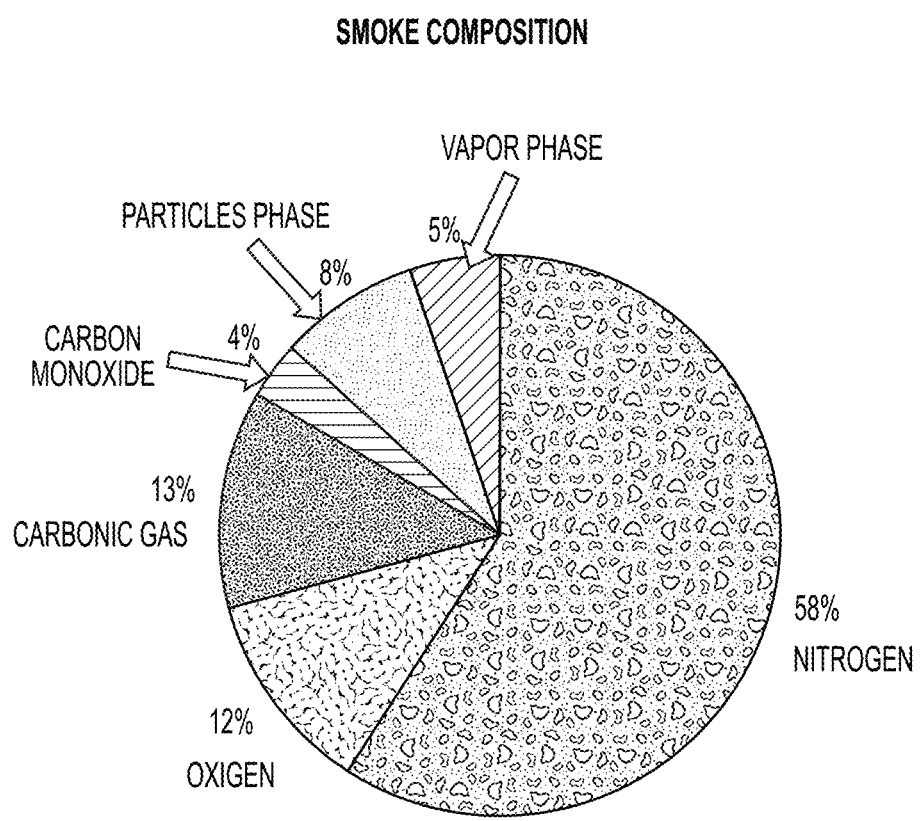
FIG. 1 illustrates a diagram describing the chemical composition of cigarette smoke.
Figure 2:
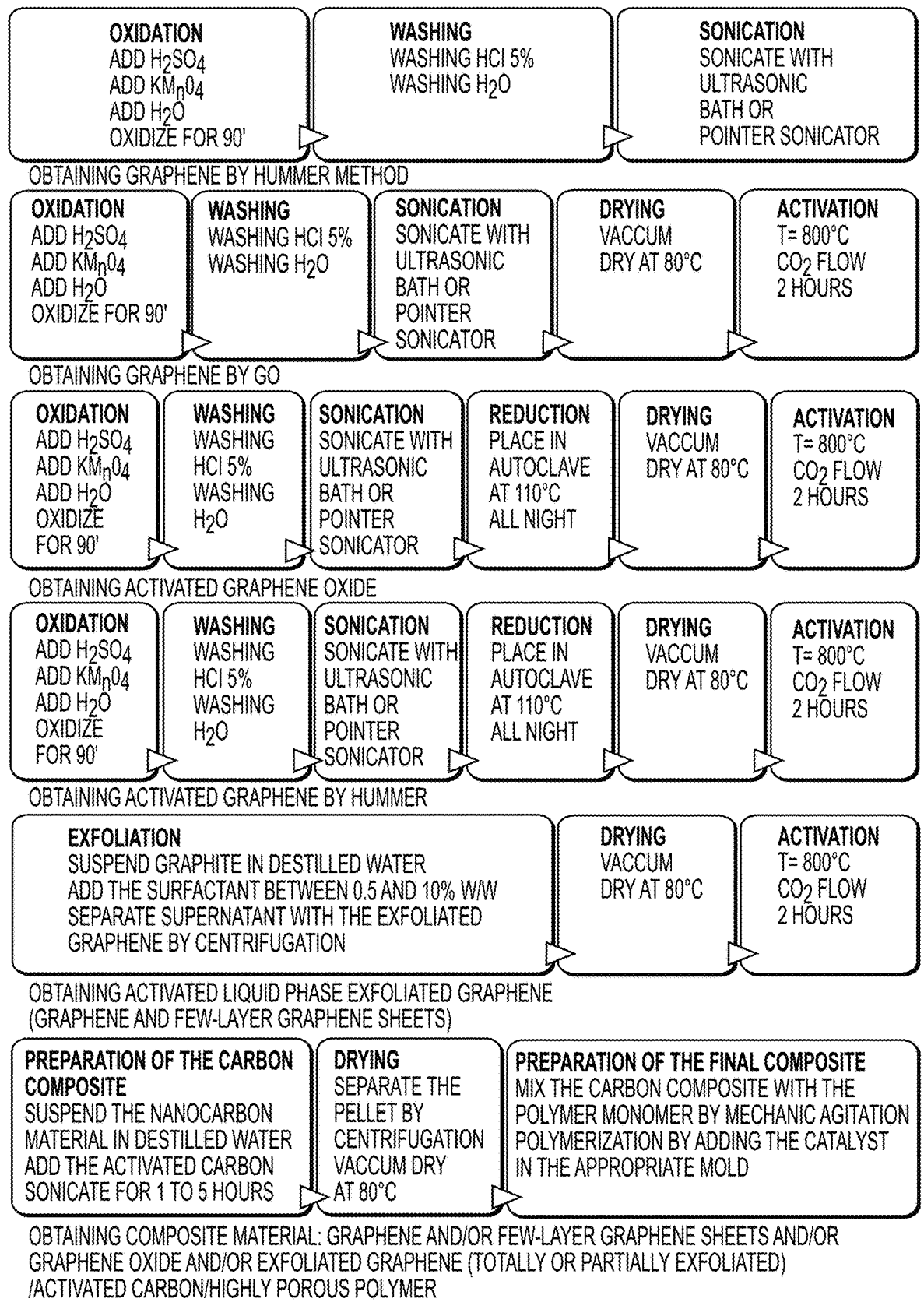
FIG. 2 illustrates a scheme describing the different stages of obtaining the material subject to this invention.
Figure 3:
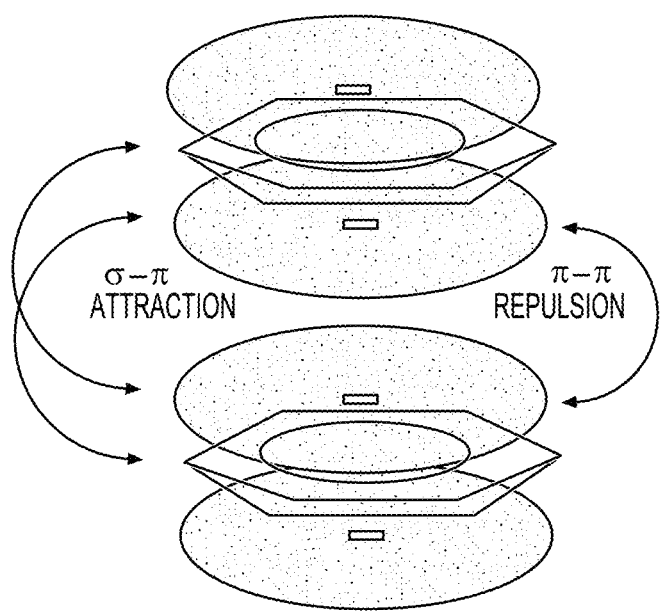
FIG. 3 illustrates a scheme of the interactions of the Q-n orbital set between the aromatic rings of graphene and the graphene nanocrystals of activated carbon.
Figure 4:
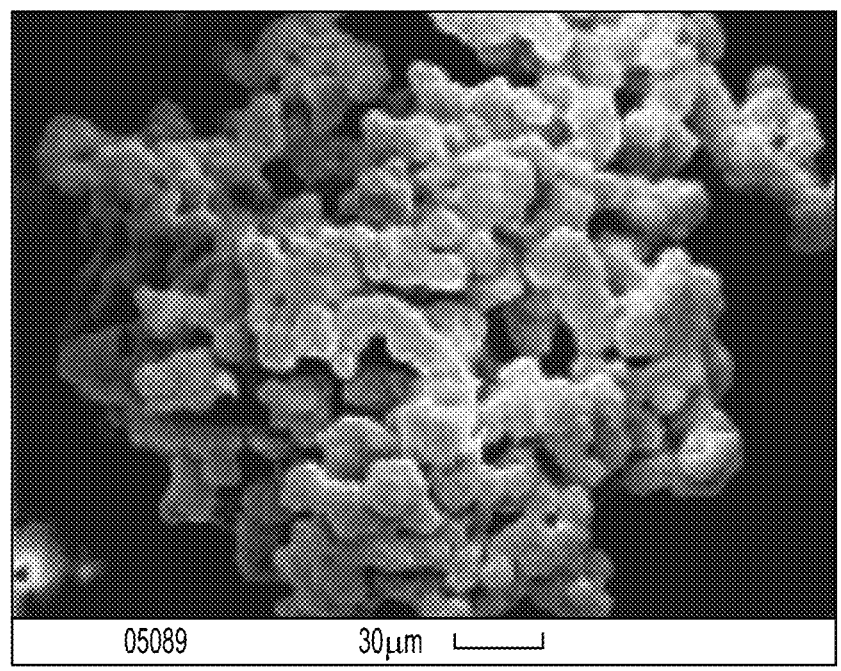
FIG. 4 illustrates a SEM (Scanning Electron Micrography) image of a porous mass synthesized from very high molecular weight polyethylene, and its porous structure may be observed.
Figure 5:
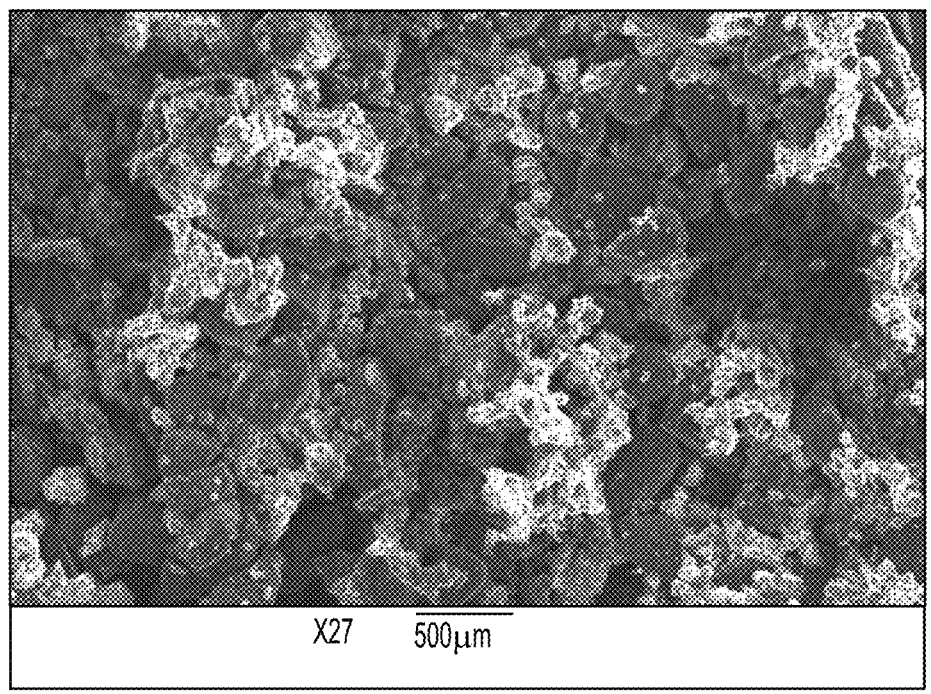

Case 2.

Cigarette C was analyzed, whose design responds to that of case 1 compared to a reference cigarette 1R6F from the University of Kentucky. The cigarette 1R6F is an international standard cigarette for research work and serves as a basis for comparing data from different laboratories. Cigarette C has a sector containing a porous mass with the following composition:

Cigarette C: Activated carbon 71%+graphene 11%+GUR 18%

Cigarette 1R6F is a cigarette with a conventional cellulose acetate filter.

Smoking trials of both cigarettes were conducted simultaneously on a Cerulean SM450 smoking machine using the Health Canada Intensive method (six replicates of each cigarette).

The results of the analysis are summarized in Table II and allow for the comparison of the reduction capacity of several polyaromatic hydrocarbons of the filter under this patent.

TABLE II

% reduction of polyaromatic hydrocarbons in cigarette C compared to cigarette 1R6F

| | Naph-talene | Acenaph-thylene | Acenaph-thene | Fluo-rene | Anthra-cene | Phenan-trene | Fluoran-thene | Py-rene | Chry-sene | Benzo[a]anthra-cene | Benzo[k]fluoran-thene | Benzo[b]fluoran-thene | Benzo[a]pyrene |
|---|---|---|---|---|---|---|---|---|---|---|---|---|---|
| Average cig. C (μg/cig) | 76 | 38 | 48 | 117 | 122 | 160 | 44 | 38 | 10 | 11 | 11 | | 7 |
| Std. dev. cig. C (μg/cig) | 20 | 9 | 11 | 26 | 24 | 13 | 6 | 4 | 2 | 2 | 1 | | 2 |
| Average 1R6F (μg/cig) | 1106 | 144 | 176 | 368 | 329 | 347 | 92 | 79 | 19 | 20 | 17 | | 15 |
| Std. dev. 1R6F (μg/cig) | 64 | 19 | 7 | 38 | 41 | 39 | 11 | 9 | 1 | 1 | 3 | | 3 |
| % Reduction | 93 | 74 | 73 | 68 | 63 | 54 | 52 | 52 | 49 | 45 | 34 | | 53 |

Case 3.

In the cigarette C smoke of case 2, the reduction of carbonyl was assessed by comparing the result with that obtained for the reference cigarette 1R6F. The two cigarettes were smoked using the ISO 3308:2012 method and extracts were analyzed according to CRM 74:2018 for the determination of eight carbonyl (six replicates of each cigarette). The result is summarized in Table III and allows comparing the carbonyl reduction capacity of the filter under this patent.

TABLE III

% reduction in cigarette carbonyl compared to cigarette 1R6F

| | Formaldehyde | Acetaldehyde | Acetone | Acrolein | Propionaldehyde | Crotonaldehyde | MEK | Butanal |
|---|---|---|---|---|---|---|---|---|
| Average cig. C (μg/cig) | 7 | 90 | 22 | 5 | 7 | 1.0 | 6 | 4 |
| Std. dev. cig. C (μg/cig) | 3 | 21 | 8 | 2 | 2 | 0.5 | 2 | 1 |
| Average 1R6F (μg/cig) | 24 | 502 | 174 | 48 | 40 | 8 | 39 | 30 |
| Std. dev. 1R6F (μg/cig) | 4 | 30 | 15 | 6 | 5 | 1 | 4 | 3 |
| % Reduction | 72 | 82 | 87 | 89 | 82 | 88 | 85 | 85 |

The invention claimed is:

1. Hybrid carbonaceous material, consisting of:
micronized graphite;
activated carbon; and
one or more of graphene materials: graphene oxide, graphene, and a plurality of graphene sheets, wherein the one or more of the graphene materials is associated with a porous polyethylene support and a specific surface greater than 900 m²/g.

2. A filter capable of retaining, in whole or in part, polyaromatic hydrocarbons, carbonyl and specific chemicals of tobacco smoke as mentioned in the list below as compared to the University of Kentucky International Reference Cigarette 1R6F: 93% naphthalene, 74% acenaphthylene, 73% acenaphthene, 68% fluorene, 63% anthracene, 54% phenanthrene, 52% fluoranthene, 49% chrysene, 52% pyrene, 45% benzo(a)anthracene, 34% benzo(k)fluoranthene, 34% benzo(b)fluoranthene, 53% benzo(a)pyrene; 72% formaldehyde, 82% acetaldehyde, 87% acetone, 89% acrolein, 82% propionaldehyde, 88% crotonaldehyde, 85% methyl-ethylketone and 85% butanal, wherein said filter contains in the same compartment the one or more of the graphene materials associated with the activated carbon and the micronized graphite as specified in claim 1, both supported by the same porous polyethylene mass, where the compartment is attached to a conventional filter compartment of cellulose acetate fibers.

* * * * *